Patented Apr. 15, 1941

2,238,783

UNITED STATES PATENT OFFICE 2,238,783

SPECIAL COATING COMPOSITION VALUES

Jackson H. Rollins and Walter E. Hatch, Toledo, Ohio

No Drawing. Application May 29, 1939, Serial No. 276,440

9 Claims. (Cl. 134—6)

This invention relates to coating compositions as to body values and controls therefor, even in ranges of various coating compositions.

This invention has utility when incorporated in spreadable mass quantity material adapted for immediate use, delayed use, and storage for subsequent use, with adaptations extending to character desired for standing up in use as well as application in use.

In carrying out this invention, ranges of problems are met arising from isolation between a support or container and the object to be supported or bulk material. In those instances wherein the intermediary of the coating composition as herein disclosed is effected, deleterious action between the material or substances spaced, has value in promoting the range of materials as to each side of this spacing substance or coating. With this in mind, desired physical properties may be taken into account as to physical strength, tenacity, insulation, combustible, and range of properties, say for a container.

Looking to the substance to be introduced into the container, there are factors arising as to whether there is tendency to dissolve the container, react detrimentally therewith, or the container to detract from the properties of the substance to be charged thereinto, as well as features of temperature. These temperature conditions arise, say in the handling of substances which may be liquid under special conditions before setting in manufacture or due to temperature. When these substances readily solidify the requirement for the package is primarily to hold until such stage is reached. This range of requirements is somewhat extensive in compositions at this date which run into the realm of plastics and resins, gums, with the almost infinite range of physical conditions which arise. In the hydrocarbon groupings referred to as bituminous, coal tar products, pitch, petroleum, there is the range of greases, oils, asphalts, pitches, tar, and compositions therewith, say toward producing other products such as roofing, linoleum, etc., and the sealing substances or dopes.

In building up coating, worthwhile approach has been developed hereunder in adopting for the body a substance normally inert as between the container and the contents therefor. That range of substances which have a wide range of inert values, is found more in the mineral than in the vegetable field, although some substances such as flours are inert and provide body in practical special ranges. The wider range, especially when there be not requirement for retaining food value in either the container or the contents, may be with inorganic or mineral substance readily powdered to fines, say in inert oxide desirably not color-imparting in solutions. Furthermore, such may go into weathered or decomposition products, say of the clay class, and as in such, kaolin has been found widely and readily adaptable even to the extent as herein treated that it seems to react in going to an impalpable powder even by avoiding the expense of prior mechanical subdivision. To effect carrying out herein, the fineness of this substance is important, for the placing of this body in such fineness association upholds its continuity as an effective wall or dam, isolating the container from the contents or the contents from the container.

To establish the holding association for the fines of this powder or clay-like material with economy in production, viscosity properties may be advantageously imparted thereto. In this connection, in order to conserve the quantity, importance has arisen in seeking to confine this establishment of association primarily to powder or clay substance. With this purpose, gelatinous properties are brought in for minimum reaching-out tendency, to the end that a weak glue may have efficiency in superficial anchorage but not be effective for depth of penetration, say into the container wall as of paper, box board, composition, or other porous or semi-porous substance. In seeking to keep away from this gelatinous anchorage strength value there is adopted incorporation of viscosity medium of the gum type of scant adhesive property.

To this end, oriental gum of Sterculiacea family has been found of economic worth, for when of the campanulate genus, it will take on as much as 100 parts of water to one part by volume of the gum. The purpose in establishing inert condition for the coating is believed to be enhanced by special treatment of these association establishing features for the inert powder. It would seem that this gum has some decomposition or reactant properties possibly of the acetate group. This theory is substantiated by reaction with salts, say in the alkali group, whether sodium, potassium or ammonium, and even of the carbonate and bicarbonate. It would seem the bicarbonate results in a reaction thorough and not detrimental to the end herein, and when say 2½ parts of ammonium bicarbonate be mixed with the one part gum in the 100 to 1 dispersion thereof, effervescence is effected at normal temperatures. Agitation or mixing causes such to subside after a short period. From the ratio taken, it would seem there is in this reaction a stabilizing value from the mineral salt.

As before stated, there is purpose in avoiding adhesive properties in this association-establishing ingredient means or agent for the powder ingredient. In adopting a weak sizing glue for this glaze value, such low grade commercial glue of the bone source may be taken, in up to 2½ parts. In withstanding this weak or thin low grade adhesive property for the glue, dispersing or thinning thereof has been effected independently of adding further water to such end by adopting as a treating reactant therewith an oxidizing agent. This may be analogous to the time interval of weather or heating the glue. It is a thinning agent and when sodium nitrate be adopted it may be up to 1 part thereof as to 2½ parts of the glue.

These association-establishing means of the gum, degenerated by the reaction as to any disturbance, stabilized against further development in aging, has viscosity disseminated property which, as homogeneous in the 101 parts for the gum and water, seems to be of such dispersing and particle-enveloping value as to the powder, taken say 40 parts by volume, that this is an efficient ratio of 2½ to 1 therebetween, meaning an effective clinging or union for the powder in the gummy envelope with scant adherence value from the glue. The mixing between the glue and the nitrate of course is not dry but with say 5 parts of water therewith. This gum, glue, thinned, stable ingredient medium desirably has imparted thereto hygroscopic values due to glycerine, say up to 7½ parts. This glycerine seems to draw or hold moisture and thereby give to the powder a resistance against tendency to crumble. This may be due to holding the vaporizable moisture into the gum or the gum and glue.

It is to be understood that in selecting these ingredients commercial efficiency is a factor and when it is stated that the high viscosity, low adhesive gum dissolved in 100 parts of water, it is to be understood that with some powders efficient and commercially economic ends may be attained in varying the ratio. That is, there may be 150 or 200 parts of water taken as to the gum, or there may be 30 or 40 parts of water according to what may be a special gum. Again, the character of the powder may require different strength, either more or less, for this viscosity factor. Also, the particular substance is to be taken into account as to the container being more or less pervious or fibrous or as to the substance to be handled, whether or not such be of solvent or attacking properties.

As to the salt to stabilize, it is a matter of economy to supply such. It may be omitted. However, in its presence, especially when ammonium bicarbonate is used, there seems to be an inter-action with the glycerine enhancing its reaction for drawing or holding moisture.

The glue as described is to be of weak adhesive property. Thus, if a higher grade glue were used, its proportion would be greatly reduced. Furthermore, if it be thinned by weathering, the nitrate or salt as to oxidizing may be eliminated. As to glycerine, it promotes hygroscopic action. This action has seemingly the property to impart and holding against crumbling in the consistency sought for the composition for a period for use. Furthermore, it seems to impart to the composition a physical condition tending to resist ready rupture or fracture of this thin film of coating as applied. It is consistent to consider that the glycerine is an agent tending toward pliability traits. Chemical reaction definitely promoting such has been found. To this end, deflocculant is adopted. The deflocculant may be according to the powder taken. In the instance the powder be clay of the kaolin group, sodium tetra pyro phosphate is such a deflocculant agent. In practice, this means there is a thinning or seemingly appearance of physical dilution independently of increasing the ingredients. In the mix, this may be added up to a ½ of 1 per cent by volume of the total coating by placing in the composition after the powder or clay. This deflocculating action with say this sodium phosphate has efficiency in as low as ⅛ of 1 per cent and commercial efficiency seems to be approached in the range of ¼ of 1 per cent. While with quantity in excess of ½ of 1 per cent, it seems to be not commercially efficient so to do. This deflocculating agent or thinner as to the coating physically seems to cause the clay particles to approach symmetrical fineness condition and thereby in a thinner film extent providing an impervious shell or dam between the container and contents.

While this phosphate has been discussed as relevant to the glycerine, the pertinency thereof is primarily in that it is to be associated with the ingredients of the composition attributing special values. It is in itself not of attributes toward pliancy to the extent that glycerine is alone or that glycerine with a special pliancy agent, say another water soluble oil as sulphonated tallow. This sulphonated tallow or castor oil may be substituted to a desired extent, more or less, for the glycerine and even up to the range of 7 per cent. In practice, say 7 per cent of the sulphonate has been found to permit the reduction of the glycerine to say 5 per cent. In the instance that a more flexible coating is desired than the initial quantity for the glycerine, the sulphonate may be used up to say 2 or 2½ times the proportion down to 3 per cent for the glycerine. The sulphonated tallow is introduced in the composition or mixture in the sequence with the glycerine or when such glycerine would be mixed.

Further control is found to establish special properties in the coating, in the durability range and to resist crumbling, with a physical strength against frangibility. Such may be called a toughening and has been attained in the adoption of mineral salts or salts of aluminum, and in such field among the salts, aluminum acetate has been a contributing factor to the extent of use up to 5 per cent of the solution. In this use, it may displace the tallow. This displacement or replacement may be partial or there may be no tallow used. The range of this toughening or durability is a factor not necessarily reacting between the container and the contents but to establish a physical condition for the coated container before charged with the contents, to the end that rough handling may not cause the coating to crumble off. Likewise, as to the pliancy factor from the tallow, a scored container to be folded has importance to resist dissolving or stain from oils, or other portions as in asphalt. This coating dam should be such that in the folding of the corners for the container, or for closure, it may not fracture or rupture and not allow oil from the hot asphalt to penetrate and attack the paper, discolor the container, or otherwise create objectionable condition.

This bending or flexing of carton from flat bank is the problem, say when the blank is of physical character analogous to chip board. Such uncoated, as hereunder, tends, at the bend, to rupture at the surface portions and thereby open up toward the inner stock with weakening therefrom. With this coating herein, pliancy is effected through, say the sulphonated tallow, mixed in the compounding with the gum before the glue or glycerine. These are factors which experience shows seem to hold the chip board against such ready rupturing at the fold and on the inner side seem to maintain the dam properties for the coating in shielding this folded corner from the contents.

These ingredients are found to cooperate in receiving even hot composition, as asphalt or asphalt dope compositions, in temperature up to say 300° to 400° F. and even higher, with absence of char or burn therefrom on the container. The coating is effective to hold the contents against penetration of the container. Furthermore, there is the helpful result in single service containers of transferring the adhesion of this coating from the container to the contents. The result is that adhesion between the contents and container is defeated and an efficient container of low cost may be produced. The severance readily effected between the contents and container not only is a matter of economy for the material cost of the container as installed but economy in isolating the contents from the container as the contents are to be used.

In some operations color of the pigment may not be a factor or may be subordinate to commercial requirements or costs, and to such end there may be impurities or color agents for say the powder to be other than white even to gray or brown tinges. Lamp black to color from gray to black has been used up to 10 per cent of the solid portion of the coating and contributes materially to plasticity in applying.

However, hereunder, trade values for distinctive products, especially for handling under temperature and due to the fact that the removal of a composition board of paper container leaves the contents with a coating, may be factors in the range for use herein to adopt color value for this coating or for portions thereof. To such end, the pigment material should be water soluble, preferably resistant to weathering, and should retain the desired property even though exposed to temperature as high as, say hot asphalt. To this end, mineral coloring as vermilion, chromates, and some of the higher temperature coal and other dyes which will withstand this temperature, may be adopted.

The desirable qualities in the coating may be maintained while enjoying economical advantages of a fluctuating market. For example, considerable saving may be had in the use of the glycerine. To this end, a glycerine having a 3 per cent higher viscosity than the normal commercial grade may be used in smaller quantity with the reduction in volume being as much as 15 per cent and even more. Further reduction in cost may be had by substituting as much as 50 per cent of the high viscosity glycerine with a sulphonated oil such as castor oil or Turkey red.

This application is a continuation-in-part of copending application for United States Letters Patent, Ser. No. 232,015, filed September 27, 1938, by Jackson H. Rollins and Walter E. Hatch, for Coating.

What is claimed and it is desired to secure by United States Letters Patent is:

1. A coating composition more particularly adapted for lining fiber containers against sticking of asphalt or the like thereto, and wherein the ingredients are of the general character and approximate proportions set forth including an inert body of kaolin, forty parts; a deflocculant for the body, of sodium tetra pyro phosphate up to one-half per cent of the body; a size which may be low grade glue up to two and one-half parts; a thinner in the event the glue be not aged, said thinner being sodium nitrate, one part; said glue and nitrate being in water solution up to five parts; a softening agent to give resistance against crumbling to the coating, said agent being glycerine up to seven and one-half parts; a superficial binder of a gum of Sterculiacea, one part; a stabilizer therefor of sodium bicarbonate, two and one-half parts; and water to be taken on by the gum up to one hundred parts.

2. A coating composition more particularly adapted for lining fiber containers against sticking of asphalt or the like thereto, and wherein the ingredients are of the general character and approximate proportions set forth including an inert body of kaolin, forty parts; a deflocculant for the body of sodium tetra pyro phosphate, one-half per cent of the body; a size which may be low grade glue up to one and one-half parts; a thinner in the event the glue be not aged, said thinner being sodium nitrate, one part; said glue and nitrate being in water solution up to five parts; a softening agent to give resistance against crumbling to the coating, said agent being glycerine up to seven and one-half parts, a superficial binder of a gum of Sterculiacea, one part; a stabilizer for the composition of sodium bicarbonate, two and one-half parts; water to be taken on by the gum up to one hundred parts; and a pliancy promotion agent of sulphonated oil up to seven parts.

3. A coating composition more particularly adapted for lining fiber containers against sticking of asphalt or the like thereto, and wherein the ingredients are of the general character and approximate proportions set forth including an inert body of kaolin, forty parts; a deflocculant for the body of sodium tetra pyro phosphate, one-half per cent of the body; a size which may be low grade glue up to two and one-half parts; a thinner in the event the glue be not aged, said thinner being sodium nitrate, one part; said glue and nitrate being in water solution up to five parts; a softening agent to give resistance against crumbling to the coating, said agent being glycerine up to seven and one-half parts; a superficial binder of a gum of Sterculiacea, one part; a stabilizer therefor of sodium bicarbonate, two and one-half parts; water to be taken on by the gum up to one hundred parts; and a toughener of aluminum acetate up to five parts.

4. A coating composition more particularly adapted for lining fiber containers against sticking of asphalt or the like thereto, and wherein the ingredients are of the general character and approximate proportions set forth including an inert body of kaolin, forty parts; a deflocculant for the body of sodium tetra pyro phosphate, one-half per cent of the body; a size which may be low grade glue up to two and one-half parts; a thinner in the event the glue be not aged, said thinner being sodium nitrate, one part; said glue and nitrate being in water solution up to five parts; a softening agent to give resistance against crumbling to the coating, said agent being glycerin up to seven and one-half parts, a superficial binder of a gum of Sterculiacea, one part; a stabilizer for the composition of sodium bicarbonate, two and one-half parts; water to be taken on by the gum up to one hundred parts; and a plasticity agent of lamp black up to ten parts.

5. A coating composition for containers for asphalt and the like to weaken adhesion of the contents thereto, including

| | Parts |
|---|---|
| A Karaya gum | 1 |
| Ammonium bicarbonate | 2.5 |
| Glue | 2.5 |
| Sodium nitrate | 1 |
| Glycerine, approximately | 7.5 |
| A clay filler, approximately | 40 | and adaptable for application in ranges for use by the addition of water for the composition to approximate consistency of house paint.

6. A coating composition for containers for asphalt and the like to weaken adhesion of the contents thereto, including

| | Parts |
|---|---|
| Karaya gum | 1 |
| Ammonium bicarbonate | 2.5 |
| Glue | 2.5 |
| Sodium nitrate | 1 |
| Glycerine, approximately | 7.5 |
| A clay filler, approximately | 40 | and adaptable for application in ranges for use by the addition of water for the composition to approximate consistency of house paint.

7. A coating composition for containers for asphalt and the like to weaken adhesion of the contents thereto, including

| | Parts |
|---|---|
| Karaya gum | 1 |
| Ammonium bicarbonate | 2.5 |
| Glue | 2.5 |
| Sodium nitrate | 1 |
| Glycerine, approximately | 7.5 |
| A Kaolin filler, approximately | 40 | and adaptable for application in ranges for use by the addition of water for the composition to approximate consistency of house paint.

8. A coating composition for asphalt containers having the property of weakening the tendency of the asphalt to adhere thereto, said composition including water to render the composition suitable to approximate consistency of house paint, and, with such water content approximately 66% of the total quantity, the remaining ingredients average

| | Per cent |
|---|---|
| A Karaya gum | .6 |
| Ammonium bicarbonate | 1.5 |
| Glue | 1.5 |
| Sodium nitrate | .6 |
| Glycerine | 4.8 |
| Clay | 25 | whereby the composition may be effective to retain said property in a range of dilution to said consistency.

9. A coating composition more particularly adapted for lining fiber containers against sticking of asphalt or the like thereto, and wherein the ingredients are of the general character and approximate proportions set forth including an inert body of clay-like filler, forty parts; a deflocculant for the body, of sodium tetra pyro phosphate up to one-half per cent of the body; a size which may be low grade glue up to two and one-half parts; a softening agent to give resistance against crumbling to the coating, said agent being glycerine up to seven and one-half parts; a superficial binder of a gum of Sterculiacea, one part; a stabilizer therefor of alkali carbonate, two and one-half parts; and water to be taken on by the gum up to one hundred parts.

JACKSON H. ROLLINS.
WALTER E. HATCH.

CERTIFICATE OF CORRECTION.

Patent No. 2,238,783.  April 15, 1941.

JACKSON H. ROLLINS, ET AL.

It is hereby certified that error appears in the printed specification of the above numbered patent requiring correction as follows: Page 4, first column, line 4, and second column, line 12, claims 5 and 8 respectively, in the table, for "Karaya" read --Kadaya--; and that the said Letters Patent should be read with this correction therein that the same may conform to the record of the case in the Patent Office.

Signed and sealed this 20th day of May, A. D. 1941.

(Seal)

Henry Van Arsdale,
Acting Commissioner of Patents.